United States Patent [19]

Fukuda

[11] Patent Number: 4,516,644
[45] Date of Patent: May 14, 1985

[54] APPARATUS FOR REGULATING FLOW OF ARTICLES IN COMPUTER SCALE

[75] Inventor: Masao Fukuda, Shiga, Japan

[73] Assignee: Kabushiki Kaisha Ishida Koki Seisakusho, Kyoto, Japan

[21] Appl. No.: 449,253

[22] Filed: Dec. 13, 1982

[30] Foreign Application Priority Data

Dec. 17, 1981 [JP] Japan .................... 56-204988

[51] Int. Cl.³ .............. G01G 19/22; G01G 13/02; B67D 3/00
[52] U.S. Cl. .................... 177/25; 177/122; 222/485
[58] Field of Search ............ 177/25, 122, 123; 222/485

[56] References Cited

U.S. PATENT DOCUMENTS

| | | | |
|---|---|---|---|
| 1,680,163 | 8/1928 | Miguet | 222/485 X |
| 3,540,538 | 11/1970 | Connors et al. | 177/122 |
| 4,398,612 | 8/1983 | Mikami et al. | 177/58 X |

*Primary Examiner*—George H. Miller, Jr.
*Attorney, Agent, or Firm*—Staas & Halsey

[57] ABSTRACT

An apparatus for controlling the flow of articles in the supply troughs of a combinatorial weighing apparatus. A plurality of flow regulating plates or baffle plates are disposed in respective or selected supply troughs arranged to extend radially from a dispersing table. An operating mechanism is provided for moving the baffle plates so that they move within the supply troughs by rotating about the center of the dispersing table.

10 Claims, 9 Drawing Figures

APPARATUS FOR REGULATING FLOW OF ARTICLES IN COMPUTER SCALE

BACKGROUND OF THE INVENTION

This invention relates to an apparatus for regulating the flow of articles supplied to a combinatorial scale of the kind which employs a computer, or a so-called computer scale. In such and apparatus the computer performs a combinatorial arithmetic operation based on weight values of articles measured by a plurality of weighing machines. Each weighing machine is associated with a plurality of article-receiving weighing hoppers and the computer selects a combination of the weighing hoppers that gives a total weight equal or closest to a preset weight and causes the articles to be released from the selected weighing hoppers. More particularly, the invention relates to such apparatus employed in supply feeders conveniently applied to such computer scale.

Supply feeders employed in computer scales are usually manufactured to a fixed size and are not adjustable in width during operation to permit regulation of the amount of article flow. The flow quantity can be controlled only by manually or automatically changing the amplitudes and/or operating time periods of the associated vibratory feeders or the level of supplied articles sensed by level sensors. However, the quantity of the articles supplied to the computer scale usually cannot be finely adjusted as desired, in spite of the complicated adjustment usually required to attempt to affect such a change.

SUMMARY OF THE INVENTION

Accordingly, an object of the present invention is to provide an apparatus for controlling the flow quantities of articles in a computer scale in which such quantities can be regulated at the supply feeders to realize fine adjustments of the supply quantities.

Another object of the present invention is to provide an apparatus for controlling the flow quantities of articles in a computer scale in which flow regulating plates or baffle plates are provided in the supply feeders for regulating flow quantities of the supplied articles and in which fine adjustments in the supply quantities can be effected through operation of the regulating plates.

Other features and advantages of the invention will be apparent from the following description taken in conjunction with the accompanying drawings.

DESCRIPTION OF THE PREFERRED EMBODIMENT

For a better understanding of the present invention, it is considered useful to first describe how the flow regulating device of the present invention functions and what role it plays in a computer scale and also how the device has been improved over comparable prior-art devices. With this in view, reference is first had to FIG. 1 illustrating the computer scale as a whole and to FIGS. 2 through 4 illustrating the prior-art regulating devices.

Figure 1:
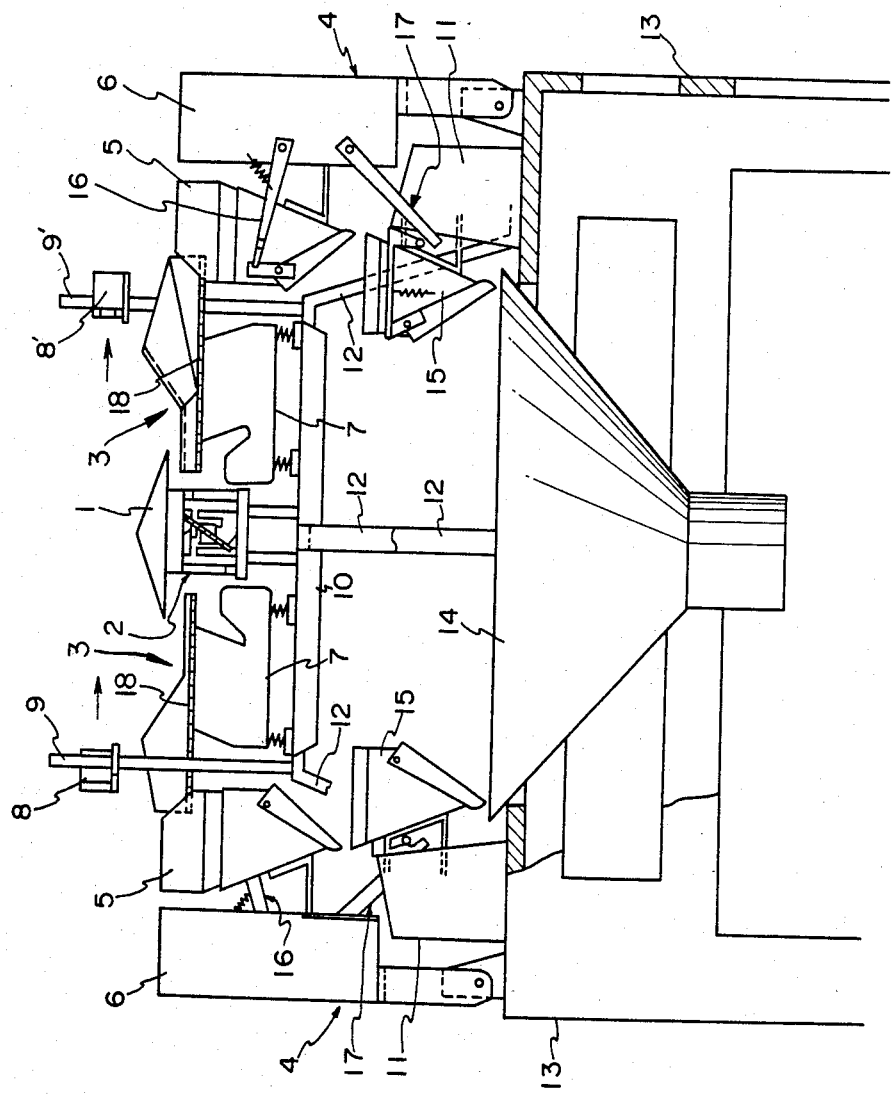
FIG. 1 is a front sectional view of a computer scale.

Referring to FIG. 1 illustrating the computer scale in its entirety, a dispersing table 1 in the form of an inverted cone is supported on an electromagnetic vibrator 2. A supply feeder includes a plurality of supply troughs 18 which 3 are arranged radially about the dispersing table 1 and have their inner ends positioned below and in close proximity to the outer periphery of the dispersing table 1. Each supply trough 18 is supported on an electromagnetic vibrator 7. The vibrators 7 and the vibrator 2 associated with the dispersing table are placed on a support table 10 and are secured to a plurality of supporting legs 12 affixed in turn to a machine frame 13. A supporting pillar 9 mounting a light projector 8 and another supporting pillar 9' mounting a light receiver 8' are secured on the supporting table 10 symmetrically with respect to the dispersing table 1. The computer scale also has a plurality of weighing machines 4 each of which has a pool hopper 5 adapted for receiving articles to be weighed from an associated one of the supply troughs 18, a weighing hopper 15 adapted for receiving the articles from the pool hopper 5, a weighing unit 11 adapted for weighing the articles received in the weighing hopper 15, and a driving unit 6 having a pair of levers 17 and 16 associated with the weighing hopper 15 and the pool hopper 5, respectively, for closing and opening these hoppers. Each supply trough 18 has its foremost part intruding into the pool hopper 5 associated therewith so that the articles delivered by the supply trough 18 may flow into the pool hopper 5. A funnel-shaped collecting chute 14 is mounted on the frame 13 and has its flared upper opening end sized to receive the articles from the weighing hoppers 15 of the weighing machines 4. The articles collected by the collecting chute are delivered for subsequent processing through the lower opening end of the collecting chute.

Figure 2:
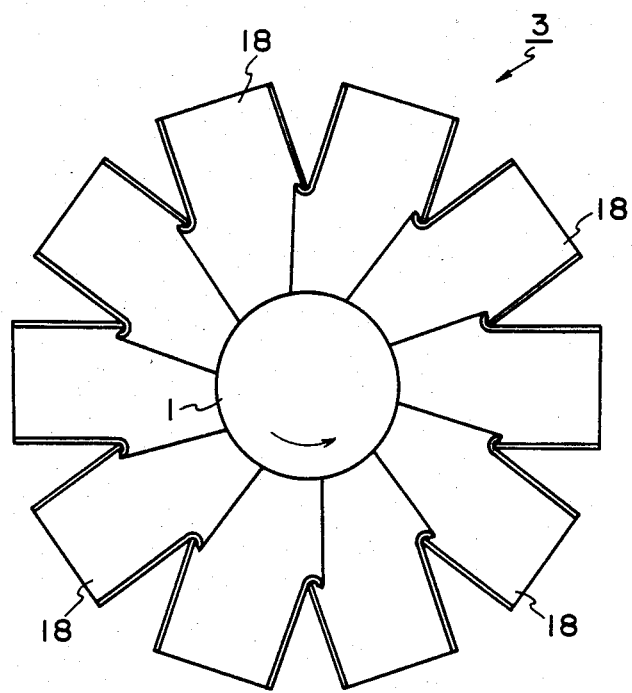
FIGS. 2 and 3 are plan and perspective views of a conventional supply feeder, respectively.
Figure 3:
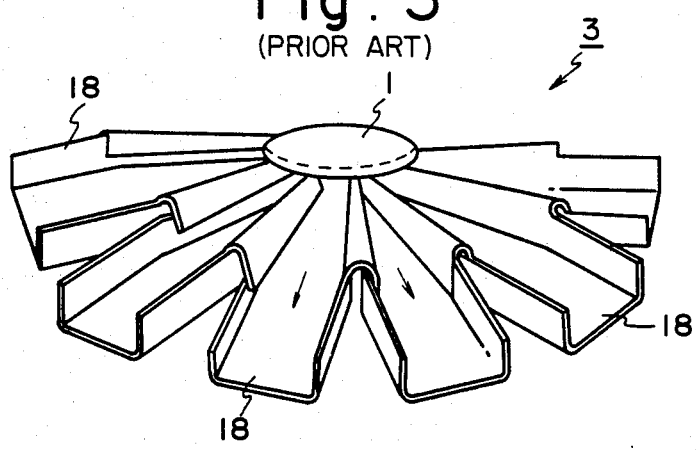
Figure 4:
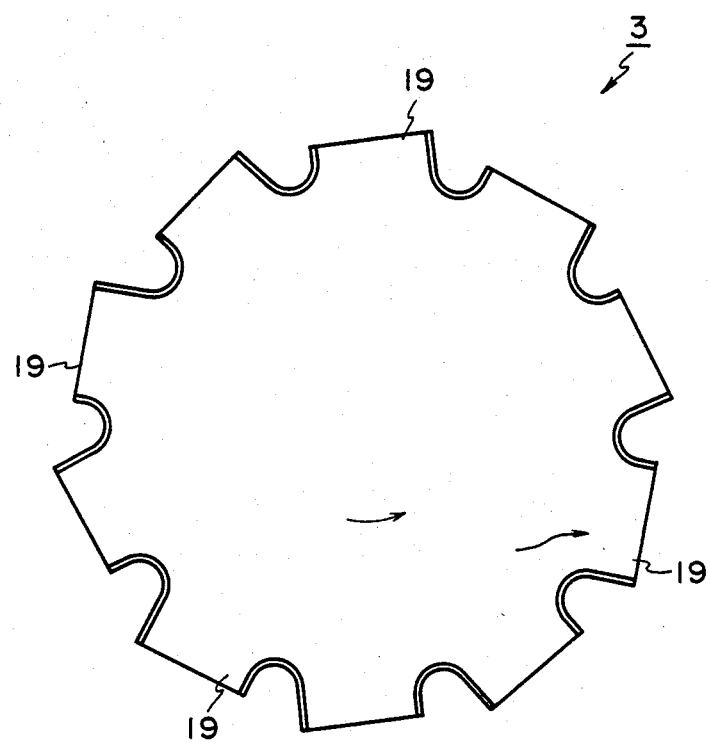
FIG. 4 is a plan view showing another conventional supply feeder.

FIGS. 2 through 4 illustrate two examples of the conventional supply feeders 3. The feeders shown in FIGS. 2, 3 employ straight supply troughs 18 formed on the rim of a disk and extending over a significant radial distance, while the feeders shown in FIG. 4 also have straight troughs 19, likewise formed on the rim of a disk, but extending only over a limited radial distance.

In operation, the articles supplied on the dispersing table 2 are dispersed to the supply feeder 3 by the operation of the electromagnetic vibrator 2. The supply troughs 18 are similarly vibrated by the electromagnetic vibrators 7, so that the articles supplied to the supply feeders 3 are supplied into pool hoppers 5 and then into weighing hopper 15 associated therewith. An electronic computer, not shown, of the computer scale then performs a combinatorial arithmetic operation based on the weight values measured in the respective weighing units and selects a combination of the weighing hoppers for which the total weight of the articles contained therein is equal or closest to a preset weight. The weighing hoppers corresponding to this combination are opened to release the articles therein into the collecting chute 14 to be further discharged therefrom onto a conveyor or into a packaging machine, not shown. Articles to be weighed are supplied to the dispersing table 1 by a supply conveyor, not shown, under control of a photoelectric sensor comprising the light projector 8 and the light receiver and, hence, in dependence upon whether a light signal is being transmitted from the light projector 8 to the light receiver 8' in such a manner that a fixed quantity of the articles may be placed on the dispensing table 1 at all times.

Figure 5:
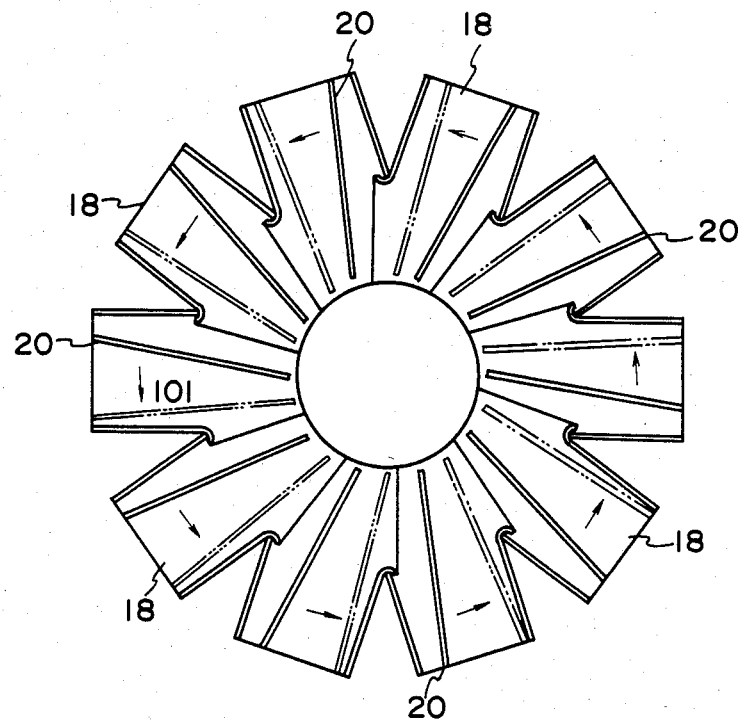
FIGS. 5 and 6 are plan and perspective views of a supply feeder and a supply trough embodying the present invention, respectively.
Figure 6:
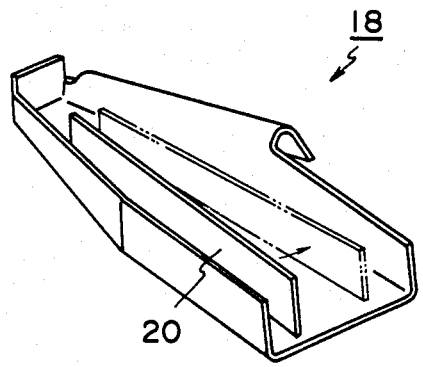

A supply feeder embodying the present invention is shown in FIGS. 5 and 6, wherein portions similar to those shown in FIGS. 1 through 4 are designated by like reference characters. A plurality of straight supply troughs are formed on the rim of the dispersing table 1 and extend radially from the dispersing table. A regulating plate or baffle plate 20 is mounted in each of the supply troughs 18. The regulating plates rotate about a center of rotation which is offset from the dispersing table 1, over a predetermined distance between a solid-line position and a position indicated by phantom lines in FIGS. 5, 6. Each regulating plate is approximately the same length as the supply trough and has a foot or an inner end close to the dispersing table and a distal end at the outlet of the supply trough.

Figure 7:
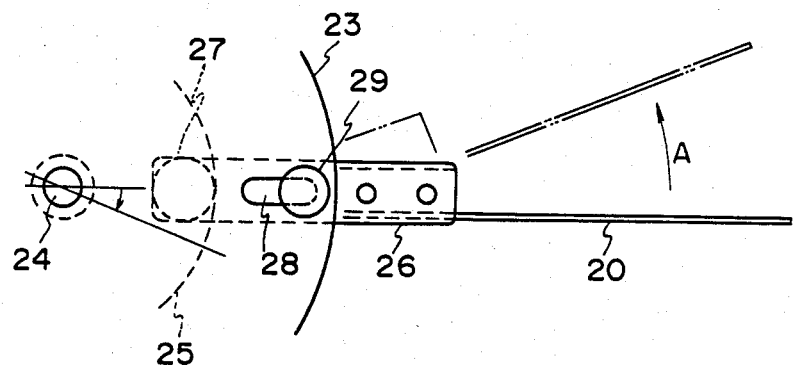
FIGS. 7 and 8 are plan and sectional views showing an operating mechanism of a regulating plate for the supply feeder, respectively.
Figure 8:
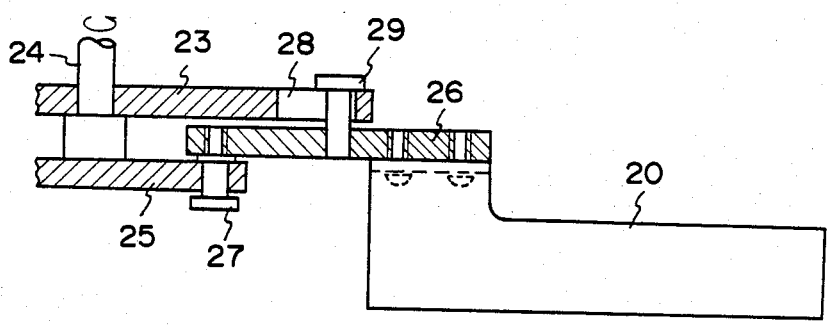

An operating mechanism for the regulating plate 20 is shown in FIGS. 7 and 8. As shown in these figures, the regulating plate 20 is secured to a supporting plate 26 having a centrally located pin 29 which is fitted in an oblong hole 28 formed on the rim of a disk 23 which is affixed to a stationary portion of the machine frame. An operating disk 25 for operating the regulating plate 20 is secured at its center to the bottom end face of a shaft 24 fulcrumed at the center of the stationary disk 23, and a pin or projection 27 having a vertical extension is secured to the outer rim of the operating disk 25, the vertical extension of pin 27 engaging with a mating opening in the supporting plate 26 on the side opposite from the regulating plate 20. It should be noted that all of the regulating plates 20 are fitted to the stationary disk 23 and operating disk 25, although only one regulating plate 20 is illustrated for clarity.

Figure 9:
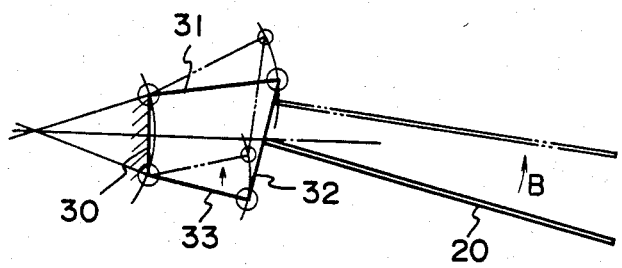
FIG. 9 is a diagrammatic view showing a modified embodiment of the operating mechanism for the regulating plate.

FIG. 9 shows a modified embodiment of the operating mechanism shown in FIGS. 7 and 8 comprising a quadric link chain formed by four rods 30 through 33 for displacing the regulating plate 20. The rod 30 of the link chain is secured to the disk 23, shown in FIGS. 7 and 8, and the regulating plate 20 is secured to the rod 32 opposite to the rod 30. The regulating plate 20 may be displaced in the direction of the arrow by displacement of the link chain indicated likewise by arrow B in FIG. 9.

In the operation of the computer scale having a supply feeder 3 as mentioned above, the regulating plates 20, mounted in respective ones of the supply troughs 18 are displaced in the direction of the arrows A and B in FIGS. 7 and 9 individually or all at once by manual operation. In this manner, the area of the flow path of each supply trough 18 may be regulated as required to control the quantity of articles to be supplied through the supply feeder 3.

In the automatic operation of the regulatory plates 20, operating parameters of the combinatorial weighing process such as target weight or apparent specific gravity of the articles to be weighed are set. A stepping motor is then driven according to a predetermined operation sequence for positioning the regulating plates 20. In the foregoing, the regulating plates 20 are mounted in all of the supply troughs 18. However, in instances where varying quantities of articles are to be supplied by the supply troughs 18, it is not always necessary that each of the supply troughs 18 be equipped with the regulating plates 20.

In the operation of the regulating plates 20 shown in FIG. 8, the shaft 24 supported by the fixed disk 23 is turned through a predetermined angle to rotate the regulating plate through a predetermined angle. The supporting plate 26, which is connected to the operating disk 25 by the projection 27, swings about the projection 29 fitted in the oblong hole 28 formed in the fixed disk 23 to displace the regulating plate 20.

In the case of the link chain shown in FIG. 9, the link chain is driven by means, not shown, for displacing the link chain and hence the regulating plate 20 as shown in FIG. 9. The link chain may be driven by any means designed to act on the rods 31 or 33 of the link chain in a well-known manner.

According to the present invention as illustrated and described hereinabove, the supply troughs 18 for supplying the articles to the computer scale are provided with regulating plates to control the quantities of the articles to be supplied by each supply trough, and the quantities of the articles supplied by the supply troughs may be controlled by the operation of the regulating plates, thus making it possible to adjust the quantities of the articles more finely than in the conventional methods which require an adjustment of supply level, vibration time intervals or amplitudes of vibration and, above all, to make possible the weighing out of even smalle quantities of articles.

As many different embodiments of the present invention can be made without departing from the spirit and scope thereof, it is to be understood that the invention is not limited to the specific embodiments thereof except as defined in the appended claims.

What I claim is:

1. A computer scale of the combinatorial weighing type, comprising:
    a dispersing table for dispersing articles to be weighed, said dispersing table having a center;
    a supply feeder, having a plurality of supply troughs extending radially from said dispersing table, for receiving articles from said dispersing table;
    a plurality of regulating plates respectively associated with and disposed in the supply troughs, for regulating the flow of articles in the supply trough, said regulating plates being approximately the same length as said supply troughs and rotatable around a center of rotation which is offset from said center of said dispersing table;
    a plurality of pool hoppers respectively associated with said supply troughs for receiving articles from said supply troughs;
    a plurality of weighing hoppers respectively associated with said pool hoppers for receiving the articles from said pool hoppers; and
    a plurality of weighing mechanisms respectively associated with said weighing hoppers for measuring the weights of the articles received by said weighing hoppers.

2. A computer scale according to claim 1, wherein said regulating plates are rotatable by an operating mechanism comprising
    a stationary disc having oblong holes, a rotary shaft provided at the center of the stationary disc, an operating disc attached to the rotary shaft, said operating disc having a plurality of projections, and a plurality of supporting plates respectively associated with and attached to said regulating plates, each said supporting plate having a hole engaged by an associated one of said plurality of projections of said operating disc, said supporting plates having central projections for engaging said oblong holes in said stationary disc.

3. A computer scale according to claim 1, wherein said regulating plates are rotated by an operating mechanism comprising a plurality of quadric link chain mechanisms each having a fixed inner rod, an outer rod secured to an associated regulating plate, and p1 two side rods of unequal length, pivotally connected at their respective ends to the inner rod and the outer rod.

4. A computer scale according to claim 1, wherein each said regulating plate has a distal end and a foot and moves circumferentially with respect to said center of rotation from a position abutting against one side wall of the supply trough in such manner that the circumferential distance traversed by the distal end of the regulating plate is larger than the circumferential distance traversed by the foot of the regulating plate.

5. A computer scale according to claim 4, wherein said regulating plates are rotatable by an operating mechanism comprising a stationary disc having oblong holes, a rotary shaft provided at the center of the stationary disc, an operating disc attached to the rotary shaft, said operating disc having a plurality of projections, and a plurality of supporting plates respectively associated with and attached to said regulating plates, each said supporting plate having a hole engaged by an associated one of said plurality of projections of said operating disc, said supporting plates having central projections for engaging said oblong holes in said stationary disc.

6. A computer scale according to claim 4, wherein said regulating plates are rotated by an operating mechanism comprising a plurality of quadric link chain mechanisms each having a fixed inner rod, an outer rod secured to an associated regulating plate, and two side rods of unequal length, pivotally connected at their respective ends to the inner rod and the outer rod.

7. A supply feeder for supplying articles in a combinatorial weighing apparatus, comprising:

a plurality of supply troughs;

a plurality of regulating plates respectively associated with and disposed in said supply troughs, for regulating the flow of articles in said supply troughs, said regulating plates being approximately equal in length to said supply troughs and having centers of rotation external of said regulating plates; and means for adjusting the position of said regulating plates by rotating said regulating plates around said centers of rotation.

8. A supply feeder according to claim 7, wherein said adjusting means includes a stationary disc having oblong holes, a rotary shaft provided at the center of the stationary disc, an operating disc attached to said rotary shaft, said operating disc having a plurality of projections, and a plurality of supporting plates respectively associated with and attached to said regulating plates, each said supporting plates having a hole engaged by an associated one of said plurality of projections of said operating disc, said supporting plates having central projections for engaging said oblong holes in said stationary disc.

9. A supply feeder according to claim 7, wherein said adjusting means includes a plurality of quadric link chain mechanisms each having a fixed inner rod, an outer rod secured to the foot of an associated regulating plate, and two side rods of unequal length, pivotally connected at their respective ends to the inner rod and the outer rod.

10. A supply feeder according to claim 7, wherein said supply troughs extend radially from a common center and said centers of rotation of said regulating plates are offset from said common center.

* * * * *

UNITED STATES PATENT AND TRADEMARK OFFICE
CERTIFICATE OF CORRECTION

PATENT NO. : 4,516,644

DATED : May 14, 1985

INVENTOR(S) : Fukuda

It is certified that error appears in the above-identified patent and that said Letters Patent is hereby corrected as shown below:

```
Col. 1, line 33, "adjustment" should be --adjustments--.
Col. 2, line 16, after "feeder" insert --3--;
        line 17, delete "3".
Col. 3, line 21, after "from" insert --the center of--.
Col. 4, line 33, "smalle" should be --smaller--.
Col. 5, line 20, "and" should be part of previous
                 paragraph; delete "pl".
```

Signed and Sealed this

Twenty-seventh Day of May 1986

[SEAL]

Attest:

DONALD J. QUIGG

Attesting Officer

Commissioner of Patents and Trademarks